United States Patent [19]

Vrieland et al.

[11] 3,923,916

[45] Dec. 2, 1975

[54] OXYDEHYDROGENATION OF ETHYL BENZENE

[75] Inventors: G. Edwin Vrieland, Midland, Mich.; Hans R. Friedli, Lake Jackson, Tex.

[73] Assignee: The Dow Chemical Company, Midland, Mich.

[22] Filed: May 28, 1974

[21] Appl. No.: 474,125

[52] U.S. Cl. ............................ 260/669 R; 252/437
[51] Int. Cl.² .......................................... C07C 5/48
[58] Field of Search ......... 260/669 R, 683.3, 680 E; 252/437

[56] References Cited
UNITED STATES PATENTS

| | | | |
|---|---|---|---|
| 3,268,611 | 8/1966 | Bajars | 260/680 D |
| 3,541,172 | 11/1970 | Stowe et al. | 260/669 R |
| 3,621,071 | 11/1971 | Noddings et al. | 260/683.3 |
| 3,641,180 | 2/1972 | Stowe et al. | 260/669 R |
| 3,793,225 | 2/1974 | Bertus et al. | 252/437 |

*Primary Examiner*—Paul M. Coughlan, Jr.
*Attorney, Agent, or Firm*—Stephen Hoynak

[57] ABSTRACT

Nickel pyrophosphate is a superior catalyst for oxydehydrogenating alkyl aromatic compounds including heterocyclics which have at least one $C_2$–$C_6$ alkyl side chain to form derivatives having side chain unsaturation. The alkyl aromatic compound can have 1–2 rings. The process is carried out at 450°–650°C. and a space velocity of 55–2,500.

3 Claims, No Drawings

OXYDEHYDROGENATION OF ETHYL BENZENE

BACKGROUND OF THE INVENTION

Certain alkaline earth-nickel phosphates, such as calcium-nickel phosphate or strontium-nickel phosphate are good dehydrogenation catalysts for converting n-butenes to butadiene or for oxydehydrogenating lower aliphatic alkanes and alkenes to dienes. Although they also dehydrogenate alkyl aromatic hydrocarbons to their alkene aromatic derivatives, these catalysts are not as active for this purpose, as are the well-known self-regenerative catalysts containing iron, zinc or magnesium oxides and potassium oxide or potassium compounds convertible to the oxide.

One of the shortcomings of the self-regenerative dehydrogenation catalysts for converting ethylbenzene to styrene is that under acceptable commercially operating conditions the conversion of the ethylbenzene is in the 35–40% range. Selectivity, however is in the 85–95% range. The self-regenerative catalysts are not sufficiently selective in oxydehydrogenation systems to be useful commercially for converting alkyl benzenes to alkene derivatives in the presence of oxygen.

Therefore, an object of this invention is the provision of a superior catalyst for oxydehydrogenation of an alkyl aromatic compound. Another object is to provide a process for oxydehydrogenating alkyl aromatic compounds in which process superior conversions with high selectivities of the alkyl group to an alkene group are obtained.

SUMMARY OF THE INVENTION

This invention concerns a novel catalytic method of oxydehydrogenating alkyl aromatic compounds having at least one $C_2$–$C_6$ alkyl group; including nitrogen heterocyclics, and 1–2 rings in the aromatic moiety, to form derivatives having aliphatic unsaturation in the side chain. The catalyst is nickel pyrophosphate. The method comprises passing a mixture of an oxygen containing gas and vapors of the alkyl aromatic compounds, with or without an inert diluent vapor, over the catalyst at a temperature of from about 450°C. to about 650°C., at a space velocity of from about 55 to about 2500.

DETAILED DESCRIPTION OF THE INVENTION

The nickel pyrophosphate catalyst of the invention can be prepared by making an aqueous solution of Ni($NO_3$)$_2$ or other water soluble nickel salt, adjusting the pH to 6–7 with ammonium hydroxide and then adding the solution to an aqueous solution of secondary ammonium phosphate which is adjusted to a pH of 6–7 with $NH_4OH$. Specifically, one means for forming the catalyst is to dissolve 84.24 g. of Ni($NO_3$)$_2$·6$H_2O$ in 250 ml. water, adjusting the pH to 6.5 with $NH_4OH$ and then adding the nickel salt solution to an aqueous solution of 44.6 g. ($NH_4$)$_2$HPO$_4$ in 250 ml. water neutralized to pH = 7 with $NH_4OH$. During addition the mixture is stirred rapidly and $NH_4OH$ is added slowly to pH 6. The precipitate was filtered and then calcined at 550°C., to convert the solid to $Ni_2P_2O_7$.

The molar ratio of oxygen to alkyl aromatic compound can range from about 0.5 to about 4.0 moles of $O_2$ per mol of alkyl aromatic compound, but a preferred range is from about 0.5 to about 1.5 and most preferred is a range of about 0.9 to about 1.1 mols $O_2$ per mol of aromatic compound.

The oxygen can be pure oxygen air or air enriched with oxygen.

The space velocity (vol./vol./hr.) can range from about 55 to 2500, but a preferred range is from about 250 to about 1,800. Most preferred is a range of from about 800 to about 1,800.

Diluents when used can be the noble gases, nitrogen, carbon dioxide or steam. These can range from about 4–16 volumes per volume of alkyl aromatic compound, but preferably range from about 4 to about 11 volumes.

The pressure at which the reaction can be run ranges from 0.5 to about 5 atmospheres, but it is preferable to operate at autogenous pressure which is generally the range of about 1 to about 2 atmospheres.

The reaction can be effected in a temperature range of from about 450°C. to about 650°C., but a preferred range is from about 500°C. to about 650°C.

Care should be exercized to avoid explosive mixtures when feeding the alkyl aromatic compound and oxygen into the reactor.

The examples which follow are intended to illustrate, but not to limit the invention. All parts are by weight unless specifically indicated otherwise.

The reactor for this and subsequent examples was a high silica glass tube 16 mm. I.D. and 42 cm. long, with an inlet for the compound to be hydrogenated and another for a premixed feed of oxygen and an inert diluent. After loading the reactor with catalyst, coarse, high silica chips were placed above the catalyst layer to serve as a mixing and preheating area. The reactor was heated by placing it in an electric resistance furnace.

The reactor was loaded with 20 ml. of the nickel pyrophosphate and then high silica chips were loaded on top of the catalyst.

The reactor outlet was connected to a valved line which was connected to a vapor phase chromatograph, in which $O_2$, $N_2$, CO and $CO_2$ and benzene, toluene, alkyl aromatic and alkenyl aromatic hydrocarbons were separated and analyzed. The column for separating the hydrocarbons contained carbowax 20 M (2% KOH) on Chromasorb P (60–80 M).

EXAMPLE 1

The feed to the reactor was in the vapor state. Feed at the rate of 90 cc per minute helium, 15 cc per minute $O_2$ and 15 cc per minute ethylbenzene (calculated at STP) was passed over the $Ni_2p_2O_7$ catalyst at a temperature of about 533°C. The GSHV was 360 hrs.$^{-1}$. Analysis showed that 65.3% of the ethylbenzene was converted with a selectivity of 89.9% to styrene.

We claim:

1. A method of dehydrogenating ethyl benzene to form styrene comprising passing an oxygen containing gas and vapors of said ethyl benzene in a mole ratio of from about 0.5 to about 4 moles of oxygen per mole of ethyl benzene over a nickel pyrophosphate catalyst at a temperature of from about 450° to about 650°C. at a space velocity of from about 55 to about 2500.

2. The method of claim 1 in which the temperature is 500°C. to 650°C. and a reaction mixture is fed at a ratio of about 0.5 to about 4.0 moles of oxygen per mole of ethyl benzene.

3. The method of claim 2 in which the temperature is 533°C., and a reaction mixture is fed at a ratio of 15 cc of $O_2$ and 90 cc of helium for each 15 cc of vaporized ethyl benzene.

* * * * *